(12) United States Patent
Sung (10) Patent No.: US 7,767,356 B2
(45) Date of Patent: Aug. 3, 2010

(54) COMMON DISTRIBUTION DEVICE OF FUEL CELL FOR VEHICLE

(75) Inventor: Yong Jin Sung, Seoul (KR)

(73) Assignee: Hyundai Motor Company, Seoul (KR)

(*) Notice: Subject to any disclaimer, the term of this patent is extended or adjusted under 35 U.S.C. 154(b) by 807 days.

(21) Appl. No.: 11/589,480

(22) Filed: Oct. 30, 2006

(65) Prior Publication Data

US 2007/0134523 A1 Jun. 14, 2007

(30) Foreign Application Priority Data

Dec. 9, 2005 (KR) .................. 10-2005-0120748

(51) Int. Cl.
*H01M 8/24* (2006.01)
(52) U.S. Cl. ..................... 429/458; 429/456
(58) Field of Classification Search ............ 429/19, 429/18
See application file for complete search history.

(56) References Cited

U.S. PATENT DOCUMENTS

2004/0110057 A1* 6/2004 Yoshimoto et al. ............ 429/38
2004/0247982 A1* 12/2004 Sabin et al. .................. 429/35

* cited by examiner

*Primary Examiner*—Patrick Ryan
*Assistant Examiner*—Brent Thomas
(74) *Attorney, Agent, or Firm*—Morgan, Lewis & Bockius LLP (57) ABSTRACT

A common distribution device of a fuel cell of a vehicle is provided where a first module and a second module comprises an air supplying portion and an air discharging portion are disposed below in the stack, and a third module and a fourth module which comprises a hydrogen supplying portion and a hydrogen discharging portion are disposed above in a stack. The fluid can be uniformly discharged from the stack during acceleration, deceleration, and tilting of a vehicle.

9 Claims, 7 Drawing Sheets

COMMON DISTRIBUTION DEVICE OF FUEL CELL FOR VEHICLE

CROSS-REFERENCE TO RELATED APPLICATION

This application claims priority to Korean Patent Application No. 10-2005-0120748 filed in the Korean Intellectual Property Office on Dec. 9, 2005, the disclosures of which are incorporated herein by reference.

BACKGROUND OF THE INVENTION (a) Field of the Invention

The present invention relates to a common distribution device of a fuel cell for a vehicle. In particular, a common distribution device of a fuel cell easily discharges water when a vehicle accelerates, decelerates or tilts.

(b) Description of the Related Art

A fuel cell is a device producing electric power by converting chemical energy into electrical energy using an electrochemical reaction of fuel. A fuel cell is an environment-friendly device and is expected to have a high electric power producing efficiency.

The fuel cell is supplied with hydrogen and air from outside of the vehicle for the electrochemical reaction. Gas remains after the reaction is discharged.

A coolant line is separately provided in order to prevent heat from being generated in a catalyst area by an exothermic reaction.

Generally, a stack (or a fuel cell stack) is a set formed by accumulating about four hundred separation plates which supplies voltage necessary to various driving devices. For maintenance purposes, most fuel cell stacks are divided into sub-stacks, having about one hundred separation plates each.

Each sub-stack has six ports: air inlet, air outlet, hydrogen inlet, hydrogen outlet, coolant inlet and coolant outlet. In case that the stack assembly is formed by combining four sub-stacks, twenty four ports should be formed.

If these ports are formed by their respective pipes, operation efficiency is substantially deteriorated and there is a risk of leak of water in connecting portions. Taking this issue into account, most stacks use a distribution device that is formed by boring the stack in a block shape and uses the bored space as a fluid passage.

However, such distribution device has a problem in that a design thereof should be changed according to the number and the disposition of the sub-stacks.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a common distribution device of a fuel cell of a vehicle in which the twenty four ports necessary for four sub-stacks are optimally connected to an outside member and water is easily discharged from a stack in conditions such as acceleration, deceleration, and tilting of a vehicle.

An exemplary embodiment of the present invention provides a common distribution device of a fuel cell of a vehicle in which a first module and a second module contain an air supplying portion and an air discharging portion which are disposed below on the stack, and a third module and a fourth module contain a hydrogen supplying portion and a hydrogen discharging portion are disposed above on the stack such that fluid can be uniformly discharged from the stack during acceleration, deceleration, and tilting of a vehicle.

An air supplying line and a hydrogen supplying line within the stack may be formed in a shape of I, and fluid may be supplied at a center portion of the shape of I.

The stack may, be provided with four sub-stacks and the respective sub-stacks are provided with six ports.

The stack has a drain for preventing stopping of an operation in tilting of a vehicle.

Pipes of the air supplying portion, the air discharging portion, the hydrogen supplying portion and the hydrogen discharging portion may be arranged as not to overlap each other.

The hydrogen supplying portion and the air supplying portion may include a linear portion and a curved portion.

A first hydrogen supplying passage and a first air supplying passage in the stack may be formed in a shape of I, and a second of the hydrogen supplying passage and a second air supplying passage may be rhombus-shaped.

DETAILED DESCRIPTION OF THE EMBODIMENTS

An exemplary embodiment of the present invention will hereinafter be described in detail with reference to the accompanying drawings.

Figure 1:
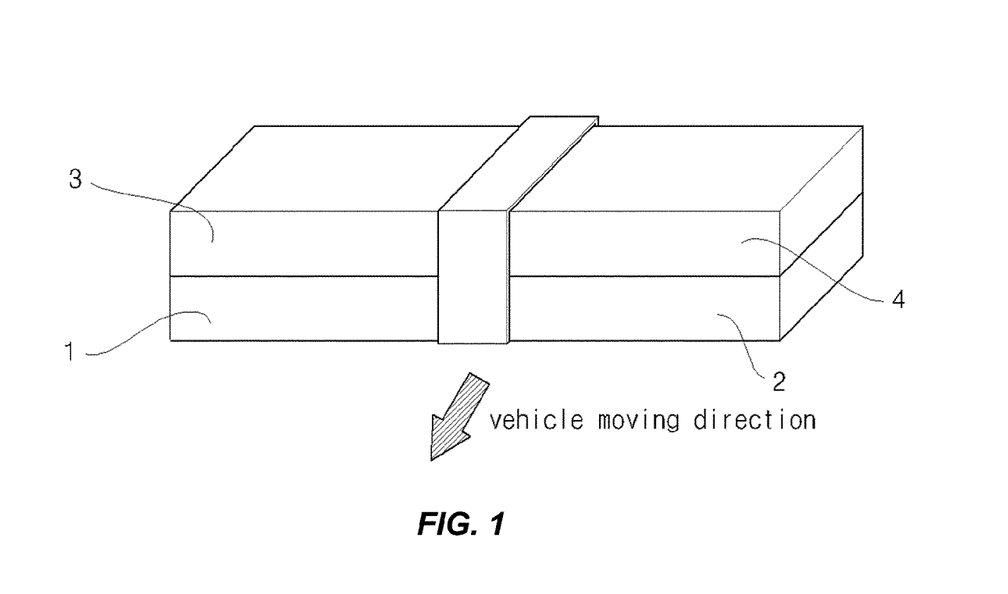
FIG. 1 is a drawing showing a common distribution device of a fuel cell for a vehicle according to an embodiment of the present invention.
Figure 2:
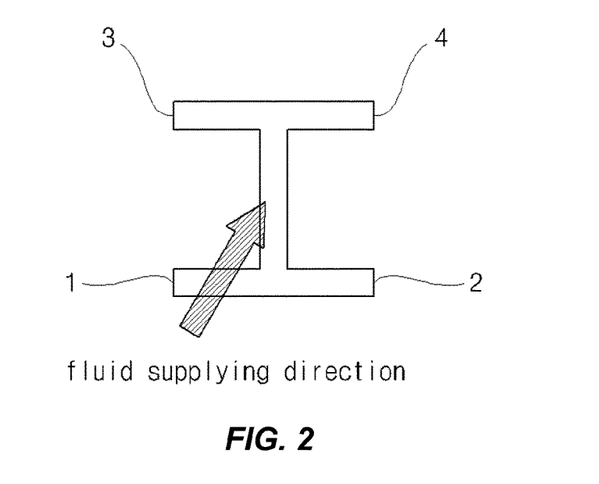
FIG. 2 is a drawing showing a manner in which fluid is supplied to a common distribution device of a fuel cell for a vehicle according to an embodiment of the present invention.
Figure 3:
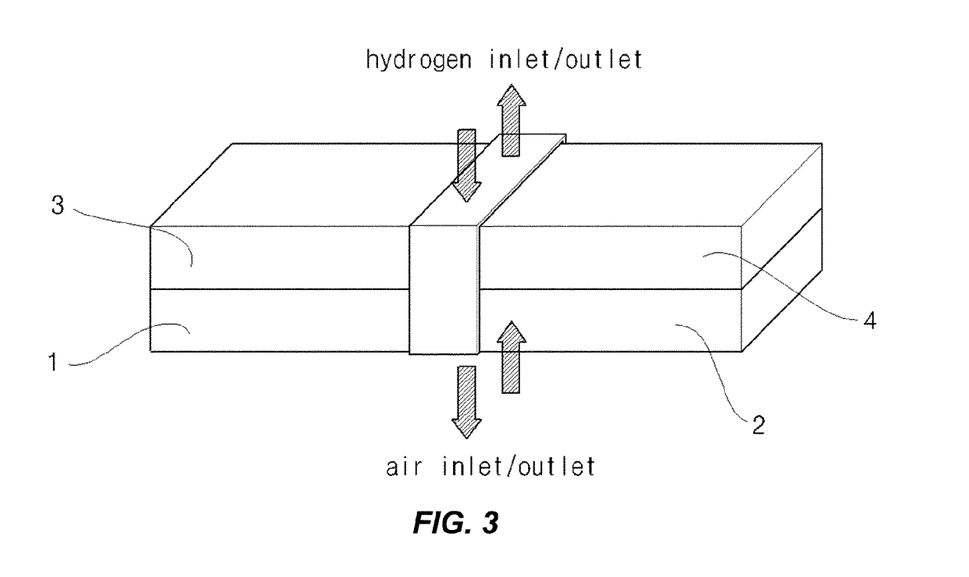
FIG. 3 is a drawing showing air inlet/outlet and hydrogen inlet/outlet formed in a common distribution device of a fuel cell for a vehicle according to an embodiment of the present invention.
Figure 4:
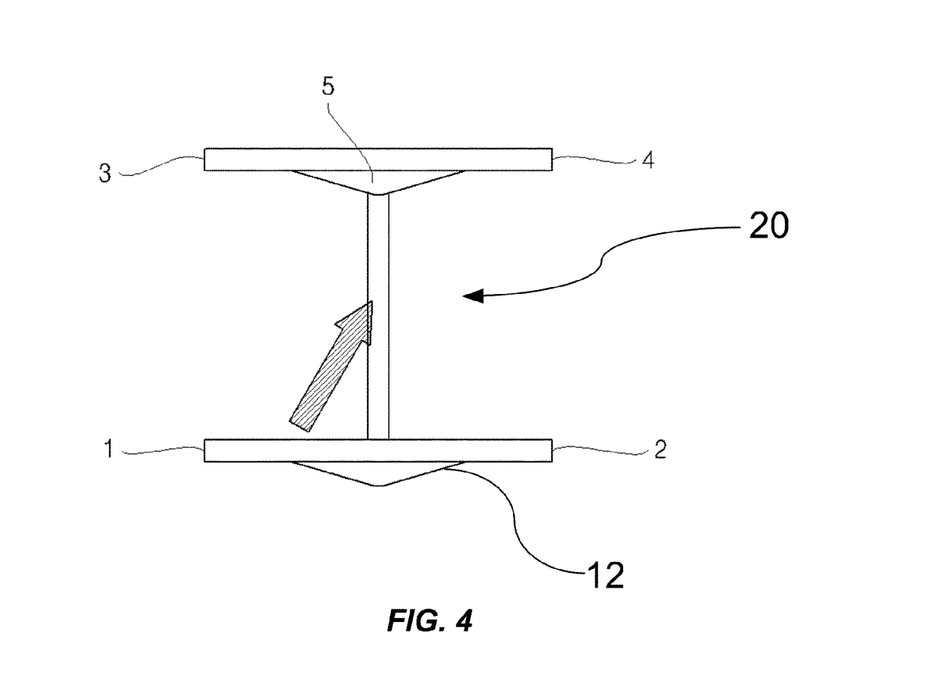
FIG. 4 is a drawing showing a state in which a drain is provided in a common distribution device of a fuel cell for a vehicle according to an embodiment of the present invention.
Figure 5A:
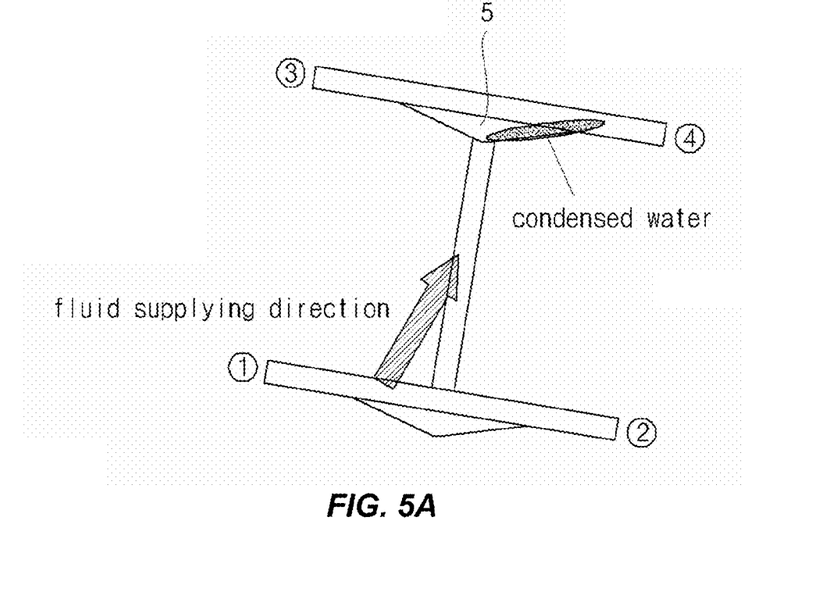
FIG. 5A and FIG. 5B are drawings showing changes in a drain of a common distribution device of a fuel cell for a vehicle that tilts laterally according to an embodiment of the present invention.
Figure 5B:
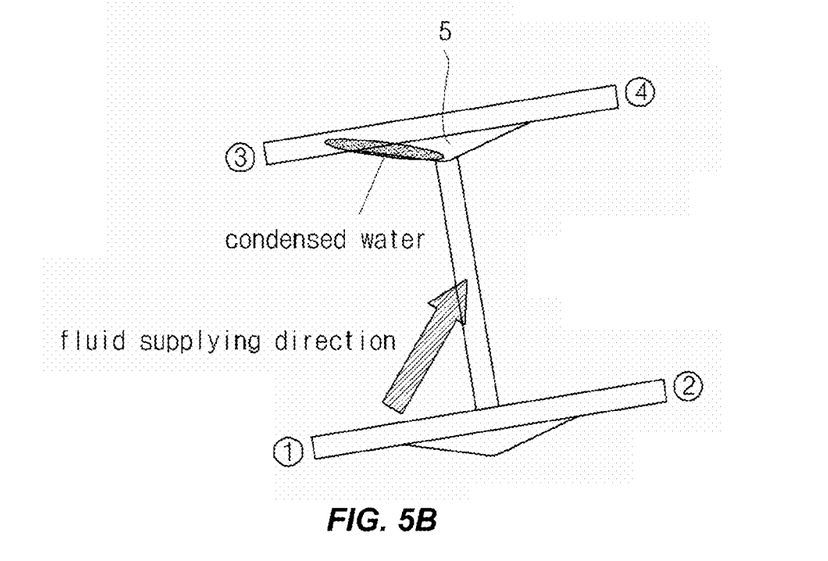
Figure 5C:
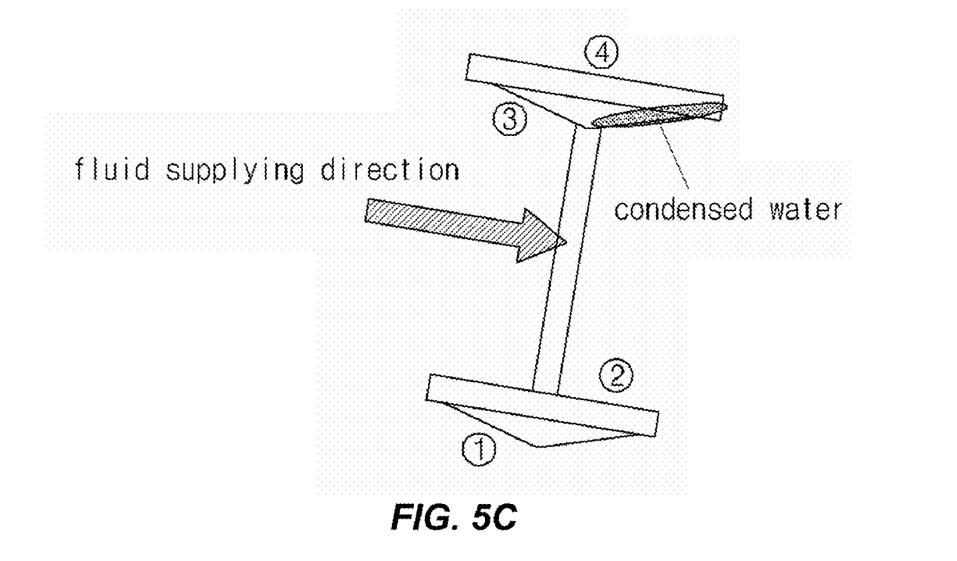
FIG. 5C and FIG. 5D are drawings showing changes in a drain of a common distribution device of a fuel cell for a vehicle in motion or when a vehicle tilts longitudinally according to an embodiment of the present invention.
Figure 5D:
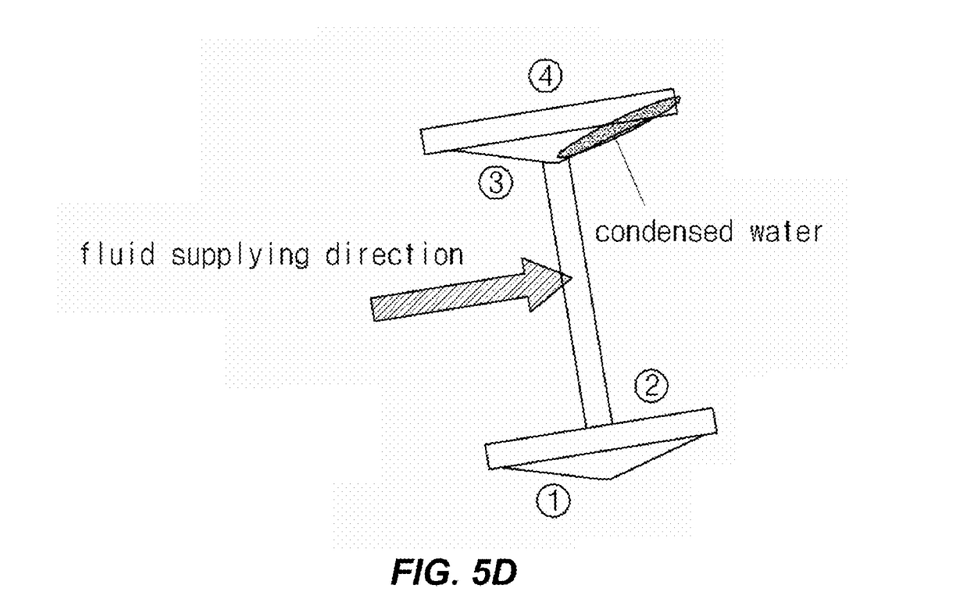
Figures 6, 7:
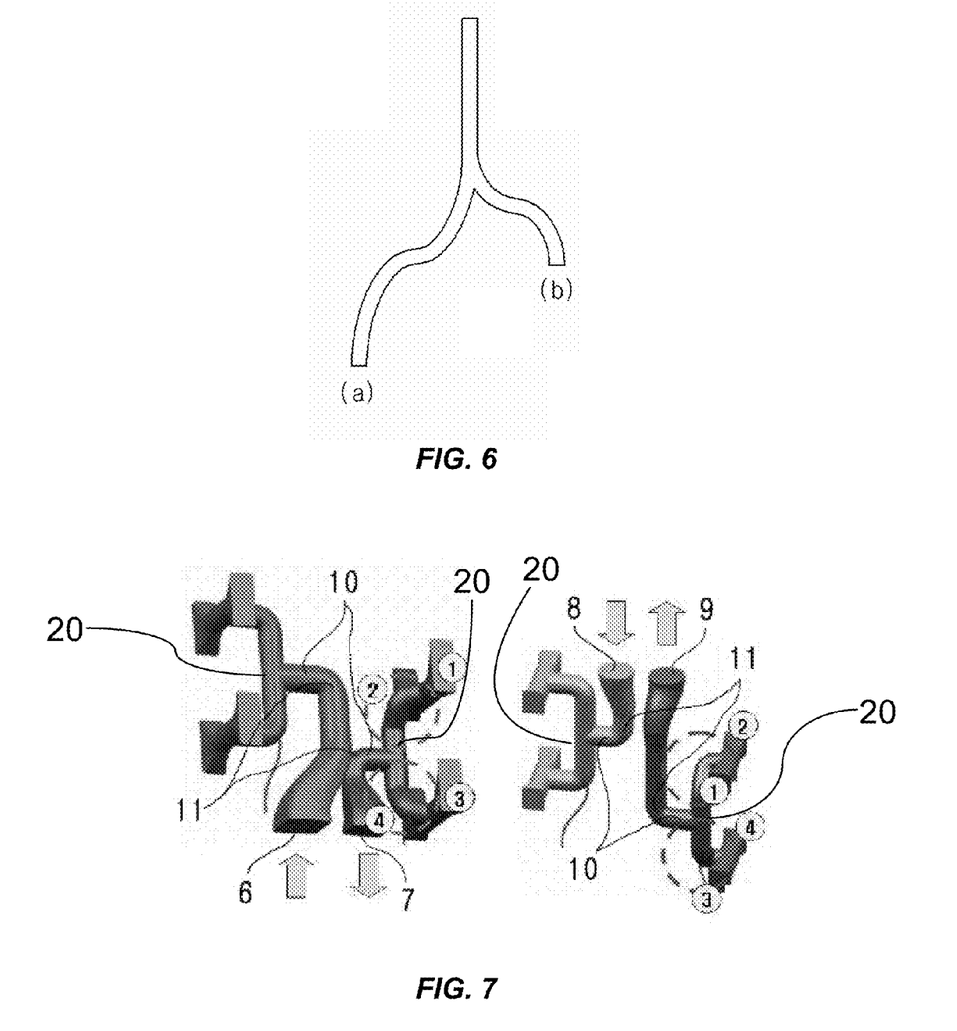
FIG. 6 is a drawing showing a shape of a fluid passage of a common distribution device of a fuel cell for a vehicle according to an embodiment of the present invention.
FIG. 7 is a drawing showing an example for avoiding an overlap of fluid distribution pipes in a common distribution device of a fuel cell for a vehicle according to an embodiment of the present invention.
Figure 8:
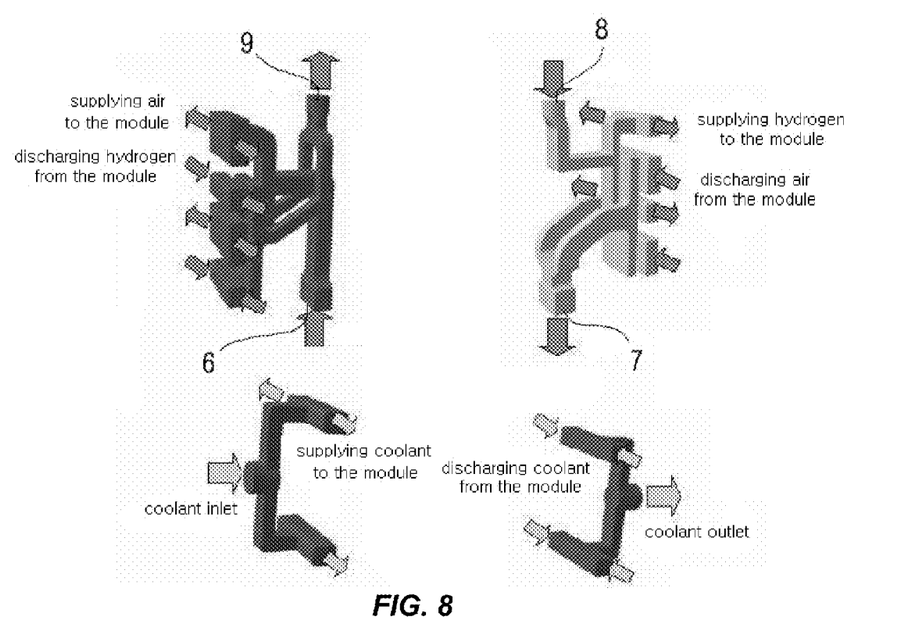
FIG. 8 is a drawing showing channels of a common distribution device of a fuel cell for a vehicle according to an embodiment of the present invention.
Figure 9:
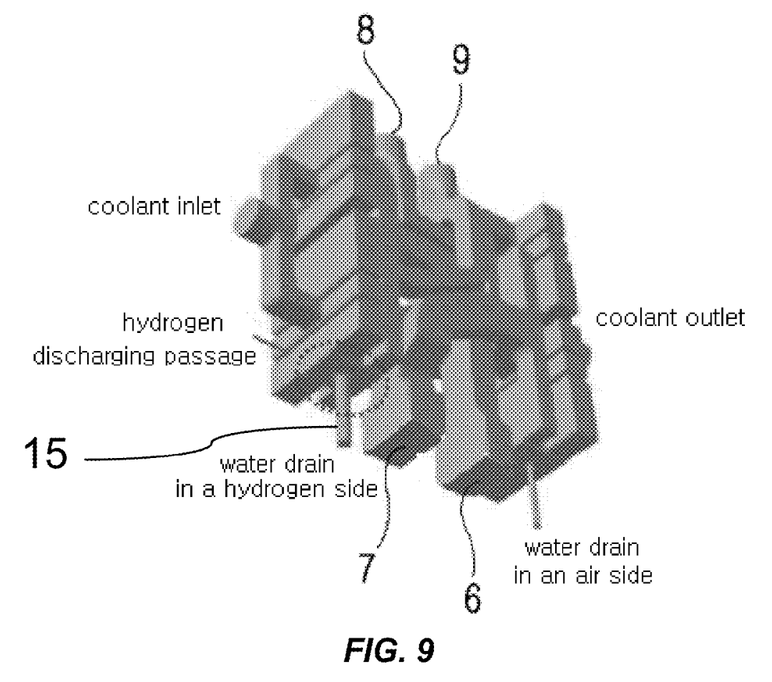
FIG. 9 is a drawing showing the different channels of FIG. 8 connected together in a common distribution device of a fuel cell for a vehicle according to an embodiment of the present invention.
Figure 10:
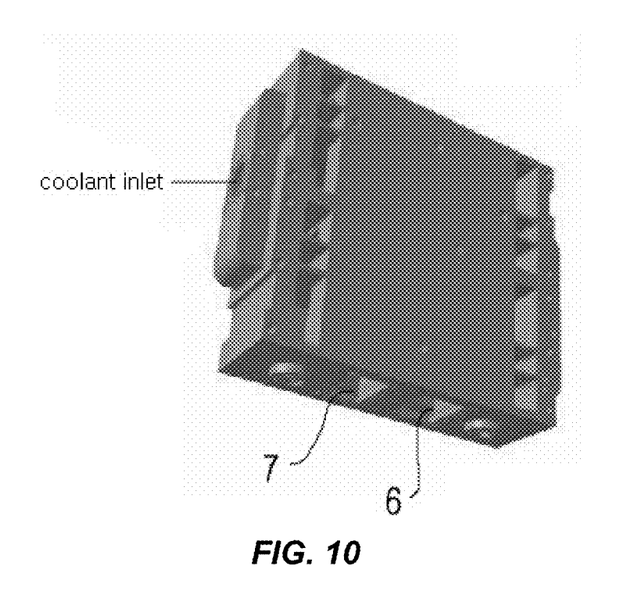
FIG. 10 is a drawing showing a common distribution device of a fuel cell for a vehicle according to an embodiment of the present invention.

FIG. 1 is a drawing showing a common distribution device of a fuel cell for a vehicle according to an embodiment of the present invention. FIG. 2 is a drawing showing a manner in which fluid is supplied to a common distribution device of a fuel cell for a vehicle according to an embodiment of the present invention. FIG. 3 is a drawing showing air inlet/outlet and hydrogen inlet/outlet formed in a common distribution device of a fuel cell for a vehicle according to an embodiment of the present invention. FIG. 4 is a drawing showing a state in which a drain is provided in a common distribution device of a fuel cell for a vehicle according to an embodiment of the present invention. FIG. 5A and FIG. 5B are drawings showing changes in a drain of a common distribution device of a fuel cell for a vehicle which tilts laterally according to an embodiment of the present invention. FIG. 5C and FIG. 5D are drawings showing changes in a drain of a common distribution device of a fuel cell for a vehicle in motion or when a vehicle tilts longitudinally according to an embodiment of the present invention. FIG. 6 is a drawing showing a shape of a fluid passage of a common distribution device of a fuel cell for a vehicle according to an embodiment of the present invention. FIG. 7 is a drawing showing an example for avoiding an overlap of fluid distribution pipes in a common distribution device of a fuel cell for a vehicle according to an embodiment of the present invention. FIG. 8 is a drawing showing different channels of a common distribution device of a fuel cell for a vehicle according to an embodiment of the present invention. FIG. 9 is a drawing showing the channels of FIG. 8 connected in a common distribution device of a fuel cell for a vehicle according to an embodiment of the present invention. FIG. 10 is a drawing showing a common distribution device of a fuel cell for a vehicle according to an embodiment of the present invention.

In most fuel cell stacks, fluid is supplied or discharged using a common distribution device.

An air side or a hydrogen side of the common distribution device tends to be humid because of the generated water or the external humidifying water. Additionally, it has been shown by experiment that condensation actually occurs within the stack.

If condensed water enters the stack without being removed, it prevents supply of reaction gas and decreases the area of an effective reaction, thereby causing serious dangers when one is driving.

Complete removal of condensed water is necessary for the possibility of cold start that is necessary for common use of a fuel cell vehicle. Complete removal of condensed water is necessary because a normal operation of the system is hindered if water remained within the system after the stop of the fuel cell is cooled.

The common distribution device plays a role of uniformly distributing an amount of fluid to respective modules, and at the same time, has to maintain a pressure drop of the whole system to be less than a specific level. The reason for this is that if pressure in the common distribution device too much drops, the capacity of an air compressor above would be overloaded, thus causing an increase in the loss of electric power.

The common distribution device can be easily designed for a stack optimized to a pressurization condition to more than 2 bar. In other words, if the width of fluid passage becomes narrow, flow development and stabilization ranges are increased, so that the distribution among modules can be easily maintained even though the fluid passage is not symmetrical.

However, for the stack operating under atmospheric pressure, the common distribution device should be designed such that it hardly affects the pressure drop of the entire system. In this case, it is further difficult to maintain the distribution among modules to be uniform.

The present invention provides a design of the common distribution device that allows a stack to be at atmospheric pressure and discharges water during "vehicle driving states".

In the present invention, "vehicle driving states" include (i) vehicle acceleration and deceleration, (ii) the natural drain in a state of no power during the shut down of a vehicle or (iii) vehicle tilting. These different vehicle states will be explained below.

At first, as shown in FIG. 1 and FIG. 2, the common distribution device designed in consideration of (i) vehicle acceleration and deceleration will be explained.

During acceleration or deceleration of a vehicle, amounts of fluid distributed to respective modules may be different from each other because of the inertia of fluid within the common distribution device.

During acceleration of a vehicle, when the first module and the second module are positioned ahead and the third module and the fourth module are positioned behind, a shortage of supply occurs in the first and the second modules, and a surplus of supply occurs in the third and fourth modules. On the other hand, during deceleration of a vehicle, a surplus of supply occurs in the first and the second modules, and a shortage of supply occurs in the third and the fourth modules.

However, if a first module 1 and a second module 2 are positioned below and a third module 3 and a fourth module 4 are positioned above as shown in FIG. 1. Fluid is supplied to a center portion in the direction of an arrow as shown in FIG. 2, and amounts of fluid distributed to respective modules 1, 2, 3, and 4 can be uniform.

Referring to FIG. 3 and FIG. 4, the common distribution device use a drain 5 as a natural drain in a state of no power during the shut down of a vehicle will be explained. Water is condensed in the air side or the hydrogen side during a driving of a vehicle and may be swept off together with air or hydrogen by inertia of air or hydrogen. In order to remove all water within the stack in a state of no power during the shut down of a vehicle, the drain 5 through which water is naturally drained by the gravity.

In an embodiment of the present invention, by changing the fluid passage of the common distribution device, the water is naturally drained through the drain 5 even though there is no power.

In addition, an air inlet and an air outlet where an amount of humidification is relatively great are positioned toward a lower portion of the module, so most condensed water that may be generated during the supply or the withdrawal at the air side is withdrawn through the drain 5.

Meanwhile, as hydrogen is positioned at an upper portion of a vehicle, diffusion easily occurs during leakage thereof, and the safety is enhanced. For this reason, it is configured that hydrogen is supplied and withdrawn at an upper portion of the module.

Next, the common distribution device in consideration of tilting of a vehicle will be explained. A vehicle may undergo a severe tilting during running on an uphill or a downhill. If a plan for removing water within a sub-stack in a slope is not formulated, a vehicle may shut down while traveling uphill or downhill.

However, as shown in FIG. 4, FIG. 5A, and FIG. 5B, a tilting angle of a structure of the drain is formed to be greater than a tilting design criterion of a vehicle, so that water is still naturally drained through the common distribution device in the lateral tilting of a vehicle. Accordingly, water can be discharged when a vehicle tilts.

In addition, as shown in FIG. 5C and FIG. 5D, the water discharging function of the common distribution device may also be obtained by the same structure of the drain 5 when a vehicle tilts longitudinally.

For the above-described structure of the common distribution device, an air line, a hydrogen line, and a coolant line form a "I" shape, and fluid is supplied or withdrawn at a center of the "I" shape. A lower drain 12 may be formed at a lower portion of the I shape 20 and a drain outlet 15 may be connected to the lower drain 12 as shown in FIG. 9 to drain the water therethrough.

However, respective sub-stacks need six ports, and a stack assembly comprised of four sub-stacks needs twenty four ports. In this case, if all ports are designed in a shape of a character I, an overlap of fluid passages is unavoidable.

Meanwhile, when fluid diverges, the amounts of diverged fluids are automatically determined depending on a pressure drop below.

In the shape shown in FIG. 6, since a pressure drop in a direction (a) is greater than that in a direction (b), an amount of fluid flowing in a direction (b) is greater than an amount of fluid flowing in a direction (a).

There are instances where a difference of a length can be disregarded if sizes of pipes are extremely small. However, in this case, great pressure loss occurs.

Accordingly, for the above-mentioned reason, it is preferable that a fluid passage of the common distribution device is branched off at a center portion.

Next, a method of avoiding an overlap by positioning four pipes of an air inlet, an air outlet, a hydrogen inlet, and a hydrogen outlet while maintaining a minimum volume and being uniformly branched off in the common distribution device of a fuel cell is described according to an embodiment of the present invention.

As shown in FIG. 7, a hydrogen inlet 8 is diverged from one supply line into four branches so as to be connected to four modules. Hydrogen remained after a reaction is discharged to the outside through one withdrawing line from the four modules.

Similarly, an air inlet 6 is diverged from one supply line into four branches so as to supply air to four modules, and air is discharged to the outside through one air discharging line from the four modules.

Pipes of a hydrogen inlet and an air inlet have a great influence on the distribution which is described below.

The air inlet 6 and the hydrogen inlet 8 are respectively brought in from the lower part and from the upper part. Distributions are performed at side portions for air inlet 6 and hydrogen inlet 8. Furthermore, there are inevitably curved portions 11 after the fluid enters air inlet 6 and hydrogen inlet 8.

Because of the curved portions, more fluid is supplied because the curved portions can hold more fluid as compared to a linear portion.

Accordingly, linear portions- 10 are provided in order to reduce effects of fluid caused by the rotation of fluid at the curved portions 11. At this time, the longer the lengths of the linear portions 10 are, the more characteristic of the distribution is improved.

Under such a disposition, air and hydrogen can be perfectly supplied to four modules of the first, the second, the third, and the fourth modules 1, 2, 3, and 4.

However, if the discharging pipes are not symmetrical, characteristics of the distribution may be substantially deteriorated because of a difference of total length as described above.

Meanwhile, in an embodiment of the present invention, in order to improve characteristics of the distribution at inlet sides of air and hydrogen, necessary spaces of the sub-stack are used.

Air or hydrogen discharged from four modules is first joined together into two pipes and is then joined together into one pipe. If this shape is repeated, an overlap may inevitably occur.

However, if the pipes are bent in order to avoid the overlap, characteristics of the distribution cannot be guaranteed, and a space for bending the pipes is not sufficient in the stack.

As mentioned above, FIG. 7 shows a case that the common distribution device is formed by bending a portion of the pipe.

As shown in the drawing, by the bending of the pipes, characteristics of the distribution among the fist, the second, the third, and the fourth modules 1, 2, 3, and 4 are substantially deteriorated.

Although this problem can be solved by reducing diameters of pipes, this may cause a great pressure drop, so this may not be suitable for an atmospheric pressure type system.

In an exemplary embodiment, under the condition of rating power of 80 kW of a stack, a pressure of 0.12 bar is formed only in an air pipe. This pressure drop is serious when pressure drops in the stack itself, a humidifier, and other pipes.

In an exemplary embodiment, an allowable pressure drop in a common distribution for a stack that operates under the pressure of 1.3 bar is about 0.06 bar.

Accordingly, the present invention solves the above-mentioned problem as follows.

As shown in FIG. 8, the fluid passage comprises an I-shaped pipe and a rhombus-shaped pipe being connected together. With the structure of FIG. 8, the overlap of fluid passages is avoided while maintaining symmetry. Since the symmetrical shape is maintained, the distribution characteristic related to a total length of fluid passage can be enhanced.

As a result, since the air outlet 7 and the hydrogen outlet 9 are arranged to be symmetrical, the lengths of the linear portions of the air inlet 6 and the hydrogen inlet 8 can be increased and the divergence can be made at a center portion.

FIG. 8 further shows a channel of a common distribution device designed using a diagram of FIG. 7 in order to prevent distribution pipes from overlapping each other. FIG. 9 is a drawing showing a method for forming air, hydrogen, and coolant supplying/discharging lines of a common distribution device by combining channels of FIG. 8. FIG. 10 is a drawing showing a common distribution device of a fuel cell that can be installed to a vehicle in which four pipes of an air inlet, a hydrogen inlet, an air outlet, and a hydrogen outlet are arranged in a structure which avoids overlap such that they can be arranged in a minimum volume and can be uniformly diverged.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A common distribution device of a fuel cell of a vehicle, comprises an air supplying portion, an air discharging portion, a hydrogen supplying portion and a hydrogen discharging portion, wherein pipe lines of the air supplying portion and the hydrogen discharging portion are interlocked with each other and lines of the air discharging portion and the hydrogen supplying portion are interlocked with each other, wherein pipe lines of the air supplying portion and the hydrogen supplying portion are not directly interlocked with each other and the air discharging portion and the hydrogen discharging portion are not directly interlocked with each other, wherein the air supplying portion, the hydrogen discharging portion, the air discharging portion and the hydrogen supplying portion include an I-shaped pipe line at end portions thereof respectively, and wherein the I-shaped pipe lines include a triangular drain extending downwards from upper and lower portion of the I-shaped pipe line respectively.

2. The common distribution device of claim 1, wherein the air supplying portion and the air discharging portion are interlocked with each other and the hydrogen supplying portion and the hydrogen discharging portion are interlocked with each other.

3. The common distribution device of claim 1, wherein the air supplying portion includes the I-shaped pipe line, a curved pipe line, and a linear pipe line connecting the curved pipe line and a center portion of the I-shaped pipe line to supply air therethrough, wherein the hydrogen supplying portion includes the I-shaped pipe line, a curved pipe line, and a linear pipe line connecting the curved pipe line and a center portion of the I-shaped pipe line to supply hydrogen thereto, wherein the air discharging portion includes the I-shaped pipe line, a curved pipe line, and a linear pipe line connecting the curved pipe line and a center portion of the I-shaped pipe line to discharge air therefrom, and wherein the hydrogen discharging portion includes the I-shaped pipe line, a curved pipe line, and a linear pipe line connecting the curved pipe line and a center portion of the I-shaped pipe line to discharge hydrogen therefrom.

4. The common distribution device of claim 3, wherein the I-shaped pipe lines of the hydrogen supplying portion and the air discharging portion are disposed opposite to the I-shaped pipe lines of the hydrogen discharging portion and the air supplying portion.

5. The common distribution device of claim 4, wherein the I-shaped pipe lines of the hydrogen discharging portion and the air supplying portion are interlocked with each other and the I-shaped pipe lines of the hydrogen supplying portion and the air discharging portion are interlocked with each other.

6. The common distribution device of claim 3, wherein the linear pipe line of the hydrogen supplying portion and the curved pipe line of the hydrogen discharging portion are interlocked with each other and the curved pipe line of the air supplying portion and the linear pipe line of the air discharging portion are interlocked with each other.

7. The common distribution device of claim 3, wherein the curved pipe line of the hydrogen supplying portion is bent upwards to receive the hydrogen downwards therethrough, the curved pipe line of the air supplying portion is bent downwards to receive the air upwards therethrough, the curved pipe line of the hydrogen discharging portion is bent upwards to receive hydrogen downwards therethrough, and the curved pipe line of the air discharging portion is bent downwards to discharge the air downwards therethrough.

8. The common distribution device of claim 3, wherein the I-shaped pipe lines of the hydrogen supplying portion, the hydrogen discharging portion, the air supplying portion and the air discharging portion are aligned in the same direction.

9. The common distribution device of claim 1, further including a drain outlet formed to the triangular drains formed in the lower portion of the I-shaped pipe line of the air supplying portion, the air discharging portion, the hydrogen supplying portion, and the hydrogen discharging portion.

* * * * *